(12) United States Patent
Keen et al.

(10) Patent No.: US 11,227,035 B2
(45) Date of Patent: Jan. 18, 2022

(54) INTELLIGENT PATTERN BASED APPLICATION GROUPING AND ACTIVATING

(71) Applicant: International Business Machines Corporation, Armonk, NY (US)

(72) Inventors: Martin G. Keen, Cary, NC (US); Sarbajit K. Rakshit, Kolkata (IN); John M. Ganci, Jr., Raleigh, NC (US); James E. Bostick, Cedar Park, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 141 days.

(21) Appl. No.: 16/192,393

(22) Filed: Nov. 15, 2018

(65) Prior Publication Data

US 2020/0159894 A1    May 21, 2020

(51) Int. Cl.
| | |
|---|---|
| *G06F 21/31* | (2013.01) |
| *G06F 21/32* | (2013.01) |
| *H04L 29/08* | (2006.01) |
| *G06F 9/48* | (2006.01) |
| *G06F 3/0481* | (2013.01) |
| *G06F 11/30* | (2006.01) |
| *G06F 11/34* | (2006.01) |
| *G06F 9/451* | (2018.01) |

(52) U.S. Cl.
CPC ........ *G06F 21/316* (2013.01); *G06F 3/04812* (2013.01); *G06F 9/4843* (2013.01); *G06F 21/32* (2013.01); *H04L 67/22* (2013.01); *G06F 9/451* (2018.02); *G06F 11/302* (2013.01); *G06F 11/3438* (2013.01); *G06F 2201/81* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,332,500 B1 * | 12/2012 | Singleton | G06Q 10/10 709/203 |
| 8,701,192 B1 * | 4/2014 | Glick | G06F 21/566 726/24 |
| 9,443,272 B2 * | 9/2016 | Wan | G06Q 10/1093 |
| 9,710,481 B1 * | 7/2017 | Darling, Jr | G06F 16/1847 |
| 9,769,274 B2 * | 9/2017 | Mapp | G06F 13/385 |

(Continued)

*Primary Examiner* — Michael W Ayers
(74) *Attorney, Agent, or Firm* — Garg Law Firm, PLLC; Rakesh Garg; Brian Restauro

(57) ABSTRACT

On a device, application usage information is monitored. From an analysis of the application usage information, an application usage pattern information is constructed. A pattern in the application usage pattern information identifies a second application in a second set of applications, wherein the second application is concurrently active with a first application in the first set of applications during an activity on the device. From a current activity on the device, the current activity having a degree of similarity above a threshold degree of similarity to the activity of the pattern in the application usage pattern information is detected. For user interaction responsive to the detecting, at least two applications selected based on the pattern are activated.

16 Claims, 6 Drawing Sheets

(56) References Cited

U.S. PATENT DOCUMENTS

| | | | |
|---|---|---|---|
| 2009/0307693 A1* | 12/2009 | Do | G06F 9/4843 |
| | | | 718/100 |
| 2011/0216064 A1 | 9/2011 | Dahl et al. | |
| 2012/0303706 A1 | 11/2012 | Young et al. | |
| 2013/0283274 A1* | 10/2013 | Mimran | G06F 9/44536 |
| | | | 718/100 |
| 2013/0305184 A1 | 11/2013 | Kim et al. | |
| 2015/0169099 A1 | 6/2015 | Lavallee | |
| 2015/0254467 A1* | 9/2015 | Leuthardt | G06F 21/606 |
| | | | 726/28 |
| 2015/0317062 A1 | 11/2015 | Jarrett et al. | |
| 2016/0162304 A1* | 6/2016 | Seacat Deluca | G06F 9/4451 |
| | | | 718/102 |
| 2016/0188169 A1* | 6/2016 | Wang | G06F 3/0481 |
| | | | 715/771 |
| 2016/0352824 A1* | 12/2016 | Miwa | H04L 67/1044 |
| 2017/0371530 A1 | 12/2017 | Vranjes et al. | |
| 2018/0097905 A1* | 4/2018 | Todasco | H04L 67/2847 |
| 2019/0347107 A1* | 11/2019 | Ma | G06N 3/08 |
| 2020/0020326 A1* | 1/2020 | Srinivasan | G10L 15/1815 |

\* cited by examiner

INTELLIGENT PATTERN BASED APPLICATION GROUPING AND ACTIVATING

TECHNICAL FIELD

The present invention relates generally to a method, system, and computer program product for application grouping. More particularly, the present invention relates to a method, system, and computer program product for intelligent context-based application grouping.

BACKGROUND

Traditionally, mobile devices have been limited to displaying only one application at a time for a user to interact with, even though additional applications can run in the background, without user interaction. As used herein, an active application is one that is both displaying visual output to a user and is ready to accept input from a user. In other words, an active application is said to be running in the foreground. In contrast, an application running in the background, or inactive, may be executing software code, but is not displaying visual output to a user and is not ready to accept input from a user. Both active applications and applications running in the background are distinct from application icons, which are small symbols representing individual applications that a user can rearrange on a display screen. A user can activate an application by selecting the corresponding application icon.

For example, consider a scenario when a user is interacting with a mapping application on such a device. Here, a user sees only the active mapping application, even though other applications, such as a telephone application and a messaging application, might be executing in the background, not visible. In the event of an incoming call, the device activates the telephone application, relegating the mapping application to background execution to allow the user to take the call. When the call ends, the device returns the telephone application to background execution and returns the mapping application to active status.

Recently, screens on such devices have been made large enough to allow a readable display of more than one application at a time. As well, operating systems, both those intended for mobile devices and those intended for non-mobile devices, now allow users to configure applications into groups, to be displayed together. As used herein, an application group refers to two or more applications that are in the active state concurrently.

SUMMARY

The illustrative embodiments provide a method, system, and computer program product. An embodiment includes a method that monitors, on a device, application usage information comprising, for each application in a first set of applications on the device, a first time at which the application is activated and a second time at which the application is inactivated, a destination to which the application sends a first portion of data, a source from which the application receives a second portion of data, the first portion of data and the second portion of data, and contextual information. An embodiment constructs, from an analysis of the application usage information, an application usage pattern information, a pattern in the application usage pattern information identifying a second application in a second set of applications, wherein the second application is concurrently active with a first application in the first set of applications during an activity on the device. An embodiment detects, from a current activity on the device, that the current activity has a degree of similarity above a threshold degree of similarity to the activity of the pattern in the application usage pattern information. An embodiment activates, for user interaction responsive to the detecting, at least two applications selected based on the pattern.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
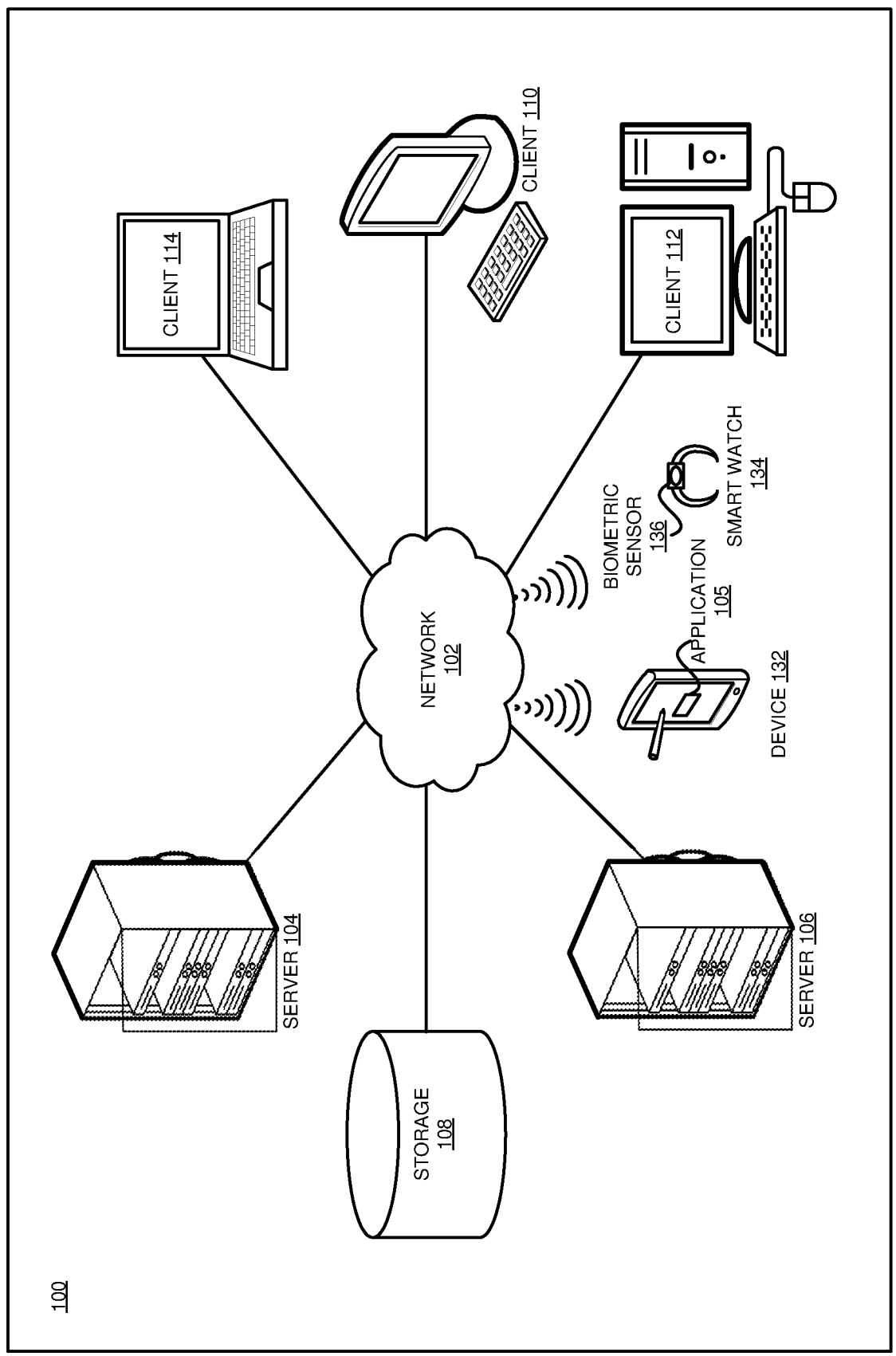
FIG. 1 depicts a block diagram of a network of data processing systems in which illustrative embodiments may be implemented.

Once applications can be grouped together, a user interface must include a mechanism both for group formation and dissolution. The illustrative embodiments recognize that currently, users form application groups manually, simply by arranging active applications on a display screen or using another provided user interface mechanism. For example, a user may want to watch a video presentation and take notes on the presentation simultaneously. To accomplish this, the user uses the provided user interface mechanism to activate a video application and a note-taking application, to watch and take notes simultaneously. As another example, if a user wants to shop online with a friend who is not physically present, she can group a shopping application and a messaging application. Using this arrangement, this user can both shop and exchange messages about the shopping with a distant friend who is using the same shopping application, without having to alternate which application is active.

Such manual groupings can be ad hoc, formed anew each time. Alternatively, such manual groupings can persist, so that, once grouped, the same applications are always activated concurrently. The illustrative embodiments recognize that neither solution meets users' needs effectively. Creating a group manually each time the need arises takes time, and is inconvenient for users who must repetitively reform their usual groupings. Permanent groupings are not appropriate to every situation either. For example, consider the user who previously grouped a video application and a note-taking application, to watch a video presentation and take notes on the presentation simultaneously. Now this user wants to watch a video and exchange messages with a friend simultaneously, requiring the messaging application instead of the note-taking application. If a user interface allows only two applications in a group, due to display screen size or computing resource limitations, the user must break one group apart to form a different group—also causing inconvenience.

The illustrative embodiments recognize that the presently available tools or solutions do not address these needs or provide adequate solutions for these needs. The illustrative embodiments used to describe the invention generally address and solve the above-described problems and other problems related to intelligent context-based application grouping.

An embodiment can be implemented as a software application. The application implementing an embodiment can be configured as a modification of an existing user interface system, as a separate application that operates in conjunction with an existing user interface system, a standalone application, or some combination thereof.

Particularly, some illustrative embodiments provide a method by which a user's context and application usage patterns can be learned, and applications grouped and regrouped as appropriate to a particular context.

An embodiment monitors application usage on a device. In particular, an embodiment tracks which applications run in the foreground, interacting with a user, and the date and time at which each application began running in the foreground and ceased to run in the foreground. From this information, an embodiment determines each application's frequency of activation and duration of activation. For example, one user might only use the telephone application, and only for a few minutes at a time. Another user might use an electronic book application, an Internet browser, an email application, a messaging application, a weather application, and a game application daily. This user uses the electronic book application for about an hour at a time, once per day, but uses the email and messaging applications for only a few minutes at time, but many times per day.

An embodiment also monitors information movement between applications and to and from the platform on which applications execute. In particular, an embodiment monitors which applications send data from the platform, which applications receive data from locations other than the platform, which applications send and receive data from which other applications within the platform, as well as the data being sent and received. Information moves onto and off the platform, for example, when a user receives an email, then composes and sends a reply. Information moves between applications within the platform, for example, when a user copies information displayed in a browser and pastes the same information into a document she is composing in a word processing application. Data includes the bytes being sent and received, but also filetypes, Uniform Resource Locators (URLs), email and message addressees, and the like.

An embodiment also monitors a user's application switching and application grouping behavior. If a user often switches between the same two applications, these two applications may be good candidates for grouping. Similarly, if a user often manually groups two applications together, these two applications may be good candidates for an embodiment to group for the user. For example, when one user is reading an electronic book, the electronic book application is the only active application. If an email or a text message is received, she switches to the appropriate application, replies to the email or text, and then returns to the electronic book application. However, when this user uses a shopping application, she also activates the messaging application, displaying the two applications side by side, to facilitate communication with friends about items she is shopping for.

An embodiment also monitors contextual factors associated with a user's application usage. Non-limiting examples of contextual factors include time of day, day of week, the user's location, other people that user is interacting with, other people that may be within a threshold distance (either physically or on a network), and a sequence of application use, including which applications a user uses concurrently. For example, when one user uses a video application during weekday working hours, she always uses a note-taking application at the same time, to take notes on the video content she is watching. However, when this same user uses the video application on weekend evenings, she always uses a messaging application at the same time, to communicate with friends while they watch the same content. Another user always uses a social media application and the email application that accesses her personal email at lunchtime on weekdays, as she spends a few minutes catching up on social media and personal email before returning to her work. A third user always uses a social media application and the email application for her personal email at the same time—but only from a local coffee shop, not from her office. A fourth user uses a shopping application concurrently with a messaging application, but only when messaging with one particular friend. A fifth user uses a video conferencing application concurrently with a note-taking application, but only when several other colleagues are also logged onto the same corporate network—this is a regular work group meeting. A sixth user always checks a weather application, then a news application, then an email application starting at 7 am each weekday, as part of her regular morning routine.

Contextual factors associated with a user's application usage also include those derived from biometric information. Biometric information—for example, a user's heart rate, perspiration rate, or the results of a step or movement sensor—can be used to help determine a user's current state. For example, one or more of a heart rate, a perspiration rate, and the results of a step or movement sensor being above preset thresholds can indicate that a user is excited and moving rapidly. Conversely, if a user's heart rate or perspiration rate are below preset thresholds, a step sensor is not registering any steps, and a movement sensor is only registering small (below a threshold) movements, this information indicates that a user is calm and sitting or lying down. Such user states can further be used to infer users' activities. For example, a user who is excited and moving rapidly could be exercising or playing a sport.

As well, users' activities relate to the applications users use and the usage patterns that result. Some applications are better suited to particular kinds of activities. For example, a user can listen to music and drive a car at the same time, but should not watch video content and drive a car at the same time, because both compete for a user's visual attention. Some user activities also require the use of particular applications. For example, some sports require detailed score keeping. If a user is participating in one of those sports, he or she might use a dedicated score keeping application to record and compute scores.

Thus, biometric information contributes to users' usage patterns. For example, a user might have a usage pattern of using a video application and a messaging application concurrently, on weekend evenings when her heartbeat—as detected by a smart watch or other fitness device—is below a threshold, in a state consistent with being relaxed and sitting down. However, this user might have another usage pattern of using a music application and a mapping application concurrently on weekday mornings when her heartbeat is above a threshold, in a state consistent with running.

An embodiment stores the data of the application usage, application switching and grouping, and contextual factors associated with a user's application usage in a usage repository. An embodiment stores the usage repository on the platform on which the monitored applications execute, in a remote location accessible using a network, or partially in both locations. Using remote storage requires that an embodiment have sufficient network connectivity to send data to the remote storage location; as well, some users may not want their usage data sent off-device for security or privacy reasons. However, using remote storage enables the use of additional, remote computing resources for data analysis and enables cross-user analysis.

An embodiment analyzes the data in the usage repository to derive application usage patterns associated with particular user contexts. To perform this analysis, an embodiment uses any pattern recognition technique, for example a clustering analysis or an association analysis. Other analysis techniques are also contemplated within the scope of the illustrative embodiments.

One type of usage pattern identifies a set of applications that a user uses concurrently, sequentially, or in some combined manner during a user activity. An embodiment uses this type of usage pattern to help identify which other applications a user might want to use concurrently. For example, a video application and a note-taking application might be used concurrently when both are in the active state, displayed side by side on a display screen. Thus, the video and note-taking applications might be good candidates for automatic concurrent use. As another example, a video application and a messaging application might be used in a combined manner if the user begins by interacting with the video application, then deactivates the video application and activates the messaging application, then deactivates the messaging application and reactivates the video application, all within a time period under a threshold time period. Thus, the video and messaging applications might also be good candidates for automatic concurrent use.

Another type of usage pattern identifies applications that communicate with each other, either directly or mediated by a user. An embodiment uses this type of usage pattern to help identify information that should automatically be passed to a second application, when a user does something in a first application. For example, a user might copy a product link from a shopping application into a messaging application, so that the friend this user is messaging with can see the same product. Another user might start a song playing in a music application, then copy the song title into a browser to search for written lyrics to the same song.

Another type of usage pattern identifies the actual information applications are expected to share with each other, based on a user's historical interaction with the applications. An embodiment uses this type of usage pattern to help identify applications that should be activated concurrently, as well as the data that should be passed between the applications. For example, if a user always starts a song playing in a music application, then copies the song title into a browser to search for written lyrics to the same song, perhaps the user would prefer that this sequence happen automatically, whenever she uses the music application.

Another type of usage pattern identifies a user's arrangement of applications that are concurrently active in close proximity of one another—e.g., on a common screen area. An embodiment uses this type of usage pattern to help identify display arrangements the user might prefer in the future. For example, when using a video application and a note-taking application concurrently, a user might always arrange the video application at the top of a display and the note-taking application at the bottom of a display, so as to have the full width of the screen visible when taking notes. The same user, when using a video application and a messaging application concurrently, might always arrange the video application so as to take up most of the display, while positioning the messaging application to take up only a small portion of the bottom right of the display, so as to devote as much screen area as possible to the video application while reserving just enough screen area to display the typically short phrases used in text messaging. The types of usage patterns described herein are only non-limiting examples, and other types of usage patterns are also possible and contemplated within the scope of the embodiments.

Once an embodiment has derived application usage patterns associated with particular user contexts, the embodiment monitors a user's behavior to identify similar user contexts (within a degree of similarity above a threshold degree of similarity), to activate applications and share information between those application as appropriate to the contexts. In particular, if an identified user context includes applications that a user activates for concurrent execution, an embodiment activates those applications for concurrent execution. If an identified user context includes applications that communicate with each other, either directly or mediated by a user, an embodiment performs context-appropriate communication. At the same time, an embodiment continues to monitor and analyze user behavior to update the application usage patterns.

For example, one user's usage pattern may be when using a video application during weekday working hours, she always uses a note-taking application at the same time, and when using the video application on weekend evenings, she always uses a messaging application at the same time, to communicate with friends while they watch the same content. Thus, when an embodiment recognizes that this user has opened the video application on a Tuesday at 10 am—within the set parameters for "weekday working hours"—the embodiment opens the note-taking application as well. Similarly, when an embodiment recognizes that this user has opened the video application on a Saturday at 10 pm—within the set parameters for "weekend evenings"—the embodiment opens the messaging application as well.

If a particular usage pattern identifies information applications are expected to share with each other, an embodiment communicates information corresponding to the usage pattern from one application to another. Using the communicated information, an embodiment displays contextually related information in an appropriate application. Thus, if according to a usage pattern a user always activates two particular applications, then copies a particular piece of information from one application to another, an embodiment, upon recognizing that this user's current context matches the usage pattern, activates the two applications if necessary, then copies pattern-appropriate information from one application to the other. For example, one user might have an established pattern of starting a song playing in a music application, and using a browser application to search for and display written lyrics to the same song. Thus, when an embodiment recognizes that this user has started a song playing in a music application, the embodiment opens the browser application as well and causes the browser application to search for and display written lyrics to the same song.

When an embodiment communicates information between applications based on a particular usage pattern, the applications may be executing on the same or different devices. For example, a user may have a device with a large display screen and a device with a comparatively much smaller display screen. This user also has a usage pattern of using a video application and a messaging application at the same time. Thus, an embodiment recognizes that this user has opened the video application on the device with the larger screen, and opens the messaging application on the device with the smaller screen.

If a particular usage pattern identifies a user's arrangement of active applications in close proximity of one another, and a current user context matches that usage pattern, an embodiment arranges currently active applications in a similar manner. For example, an embodiment might recognize that when using a video application and a note-taking application together, a user always arranges the video application at the top of a display and the note-taking application at the bottom of a display. Thus, when an embodiment activates these two applications for concurrent user interaction, the embodiment always places the video application at the top of a display and the note-taking application at the bottom of the display. An embodiment might recognize that the same user, when using a video application and a messaging application together, always arranges the video application so as to take up most of the display, while positioning the messaging application to take up only a small portion of the bottom right of the display. Thus, when an embodiment displays these two applications simultaneously for this user, the embodiment always positions the video application at the top left of display, occupying most of the available display space, and positions the messaging application to take up only a small portion of the bottom right of the display.

Because an embodiment monitors a user's behavior to identify similar user contexts, activate applications, and share information between those application as appropriate to the contexts, the embodiment also recognizes when a user's behavior diverges from an original identified context, and is now similar to a different context. For example, an embodiment may have recognized that a user has a usage pattern of also consulting her banking application when using a shopping application to shop for furniture, but not consulting her banking application, and instead messaging friends, when using the shopping application to shop for clothing. Thus, when the embodiment detects that this user is using the shopping application to shop for items in the furniture category, the embodiment activates the banking application as well, so that the shopping and banking applications are active concurrently. However, when the embodiment detects that this user is now using the shopping application to shop for items in the clothing category, the embodiment activates the messaging application in the place of the banking application.

Because an embodiment monitors a user's behavior to identify similar user contexts, the embodiment uses biometric information to recognize when a user's behavior diverges from an original identified context, and is now similar to a different context. For example, an embodiment may have recognized that a user has a usage pattern of using a music application and a mapping application together on weekday mornings when her heartbeat is above a threshold, in a state consistent with running. Thus, on Monday morning at 6:30 am (within the parameters of "weekday morning" but the user's heartbeat is below the threshold) this user's context is not sufficiently similar to running. However, on Monday morning at 7 am (within the parameters of "weekday morning" when the user's heartbeat rises above the threshold for at least a length of time above another threshold, an embodiment recognizes that this user's context has changed, is now consistent with running, and activates the music application and the mapping application concurrently.

An embodiment continues to monitor and analyze user behavior to update the application usage patterns. For example, an embodiment may have recognized a usage pattern of a user using a video application and a messaging application simultaneously. Thus, when the embodiment detects that this user has opened the video application, the embodiment also opens the messaging application. However, if over time the embodiment detects that this user no longer uses the messaging application when both are open together, the embodiment updates the known usage patterns for this user to cease opening the messaging application when the user opens the video application.

The manner of intelligent context-based application grouping described herein is unavailable in the presently available methods. A method of an embodiment described herein, when implemented to execute on a device or data processing system, comprises substantial advancement of the functionality of that device or data processing system in monitoring a user's application usage, analyzing a user's application usage to determine patterns, and recognizing when a user's usage matches those patterns to present applications on a device in a manner that conforms to detected patterns.

The illustrative embodiments are described with respect to certain types of events, factors, contexts, patterns, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
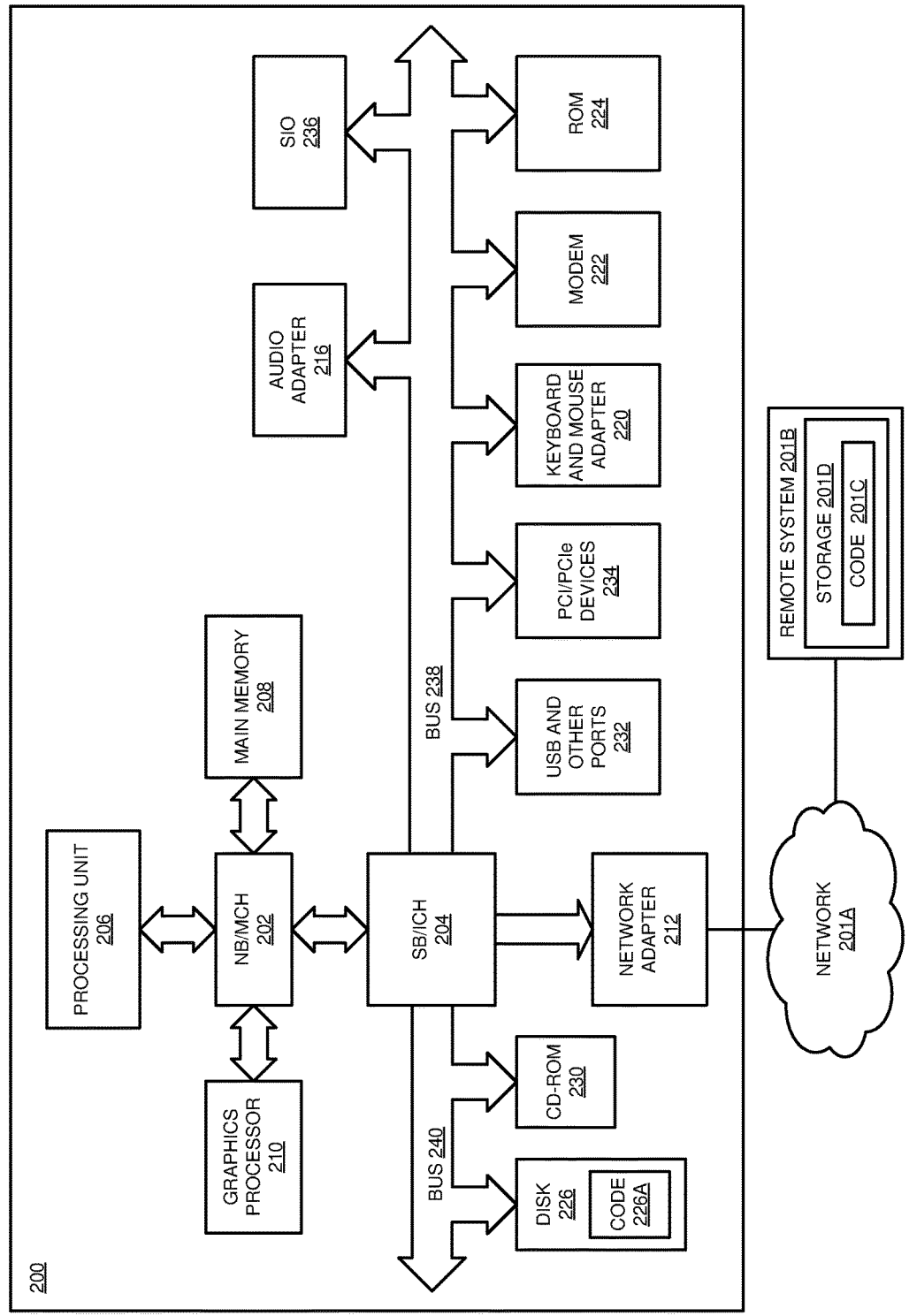
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Smart watch 134 is another example of a device described herein, and includes biometric sensor 136. Any software application described as executing in another data processing system in FIG. 1 can be configured to execute in device 132 or smart watch 134 in a similar manner. Any data or information stored or produced in another data processing system in FIG. 1 can be configured to be stored or produced in device 132 or smart watch 134 in a similar manner.

Application 105 implements an embodiment described herein. Application 105 may run in device 132 or smart watch 134, or any of servers 104 and 106 and clients 110, 112, and 114.

Servers 104 and 106, storage unit 108, and clients 110, 112, and 114, and device 132 and smart watch 134 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114, device 132, and smart watch 134. Clients 110, 112, and 114 may be clients to server 104 in this example. Clients 110, 112, 114, device 132, and smart watch 134, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
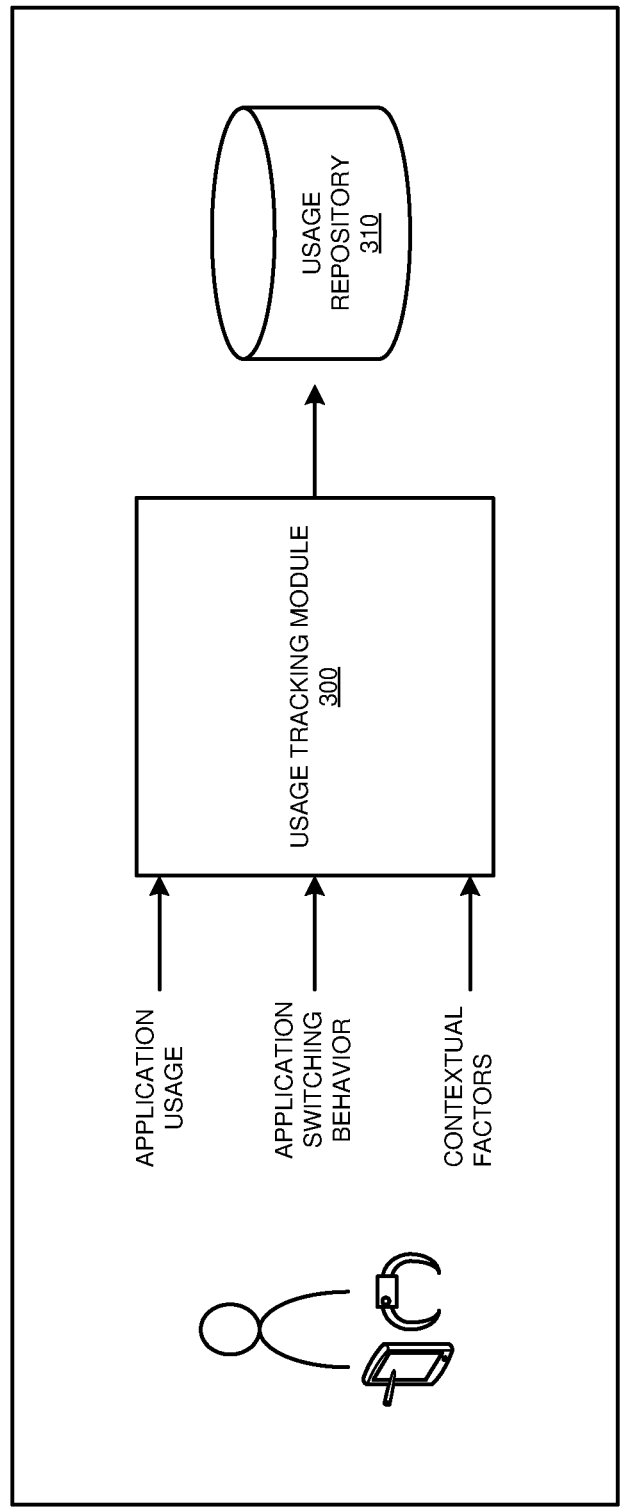
FIG. 3 depicts a block diagram of a portion of an example configuration for intelligent context-based application grouping in accordance with an illustrative embodiment.

With reference to FIG. 3, this figure depicts a block diagram of a portion of an example configuration for intelligent context-based application grouping in accordance with an illustrative embodiment. Application 300 is an example of application 105 in FIG. 1 and executes in device 132 or smart watch 134, or any of servers 104 and 106 and clients 110, 112, and 114 in FIG. 1.

Usage tracking module 300 monitors a device, such as device 132 or smart watch 134, during usage. In particular, usage tracking module 300 tracks which applications run in the foreground, interacting with a user, and the date and time at which each application began running in the foreground and ceased to run in the foreground. From this information, usage tracking module 300 determines each application's frequency of activation and duration of activation.

Usage tracking module 300 also monitors information movement between applications and to and from a device, such as device 132 or smart watch 134 on which applications execute. In particular, usage tracking module 300 monitors which applications send data from device 132, which applications receive data from locations other than device 132, which applications send and receive data from which other applications within device 132, as well as the data being sent and received. Information moves onto and off device 132, for example, when a user receives an email, then composes and sends a reply. Information moves between applications within device 132, for example, when a user copies information displayed in a browser and pastes the same information into a document she is composing in a word processing application. Data includes the bytes being sent and received, but also filetypes, Uniform Resource Locators (URLs), email and message addressees, and the like.

Usage tracking module 300 also monitors a user's application switching and application grouping behavior and contextual factors associated with a user's application usage. Non-limiting examples of contextual factors include time of day, day of week, the user's location, other people that user is interacting with, other people that may be within a threshold distance (either physically or on a network), and a sequence of application use, including which applications a user uses concurrently. Contextual factors associated with a user's application usage also include those derived from biometric information, such as a biometric sensor included in smart watch 134. Usage tracking module 300 stores the data of the application usage, application switching and grouping, and contextual factors associated with a user's application usage in usage repository 310.

Figure 4:
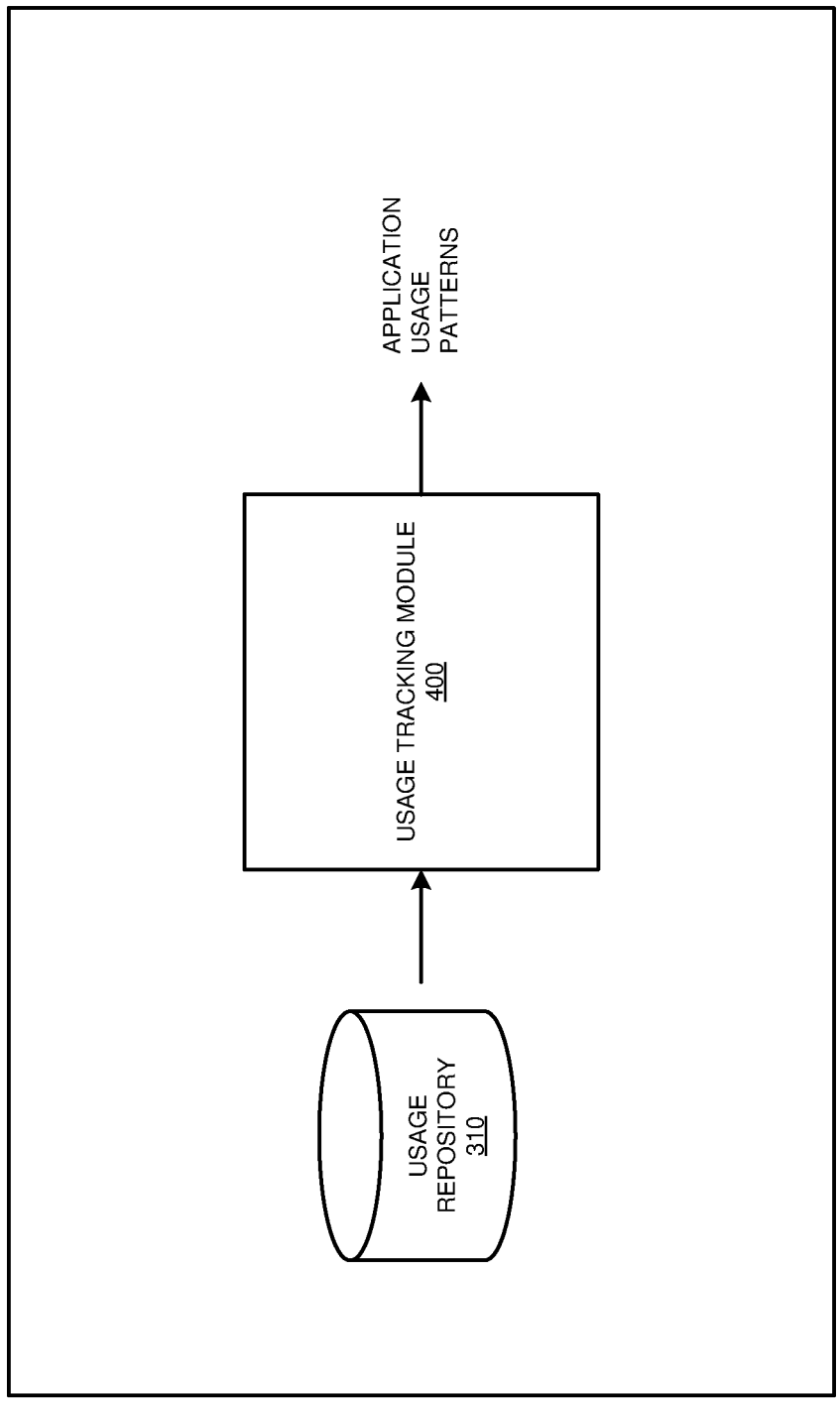
FIG. 4 depicts a block diagram of another portion of an example configuration for intelligent context-based application grouping in accordance with an illustrative embodiment.

With reference to FIG. 4, this figure depicts a block diagram of another portion of an example configuration for intelligent context-based application grouping in accordance with an illustrative embodiment. Application 400 is an example of application 105 in FIG. 1 and executes in device 132 or smart watch 134, or any of servers 104 and 106 and clients 110, 112, and 114 in FIG. 1. Usage repository 310 is the same as usage repository 310 in FIG. 3.

Usage analysis module 400 analyzes the data in usage repository 310 to derive application usage patterns associated with particular user contexts, using a clustering analysis. One type of usage pattern identifies a set of applications that a user uses concurrently, sequentially, or in some combined manner during a user activity, to help identify which other applications a user might want to use concurrently. Another type of usage pattern identifies applications that communicate with each other, either directly or mediated by a user, to help identify information that should automatically be passed to a second application, when a user does something in a first application. Another type of usage pattern identifies the actual information applications are expected to share with each other, based on a user's historical interaction with the applications, to help identify applications that should be activated concurrently, as well as the data that should be passed between the applications. Another type of usage pattern identifies a user's arrangement of applications that are concurrently active in close proximity of one another—e.g., on a common screen area—to help identify display arrangements the user might prefer in the future. Usage analysis module 400 also derives additional application usage patterns, as appropriate to the data being analyzed.

Figure 5:
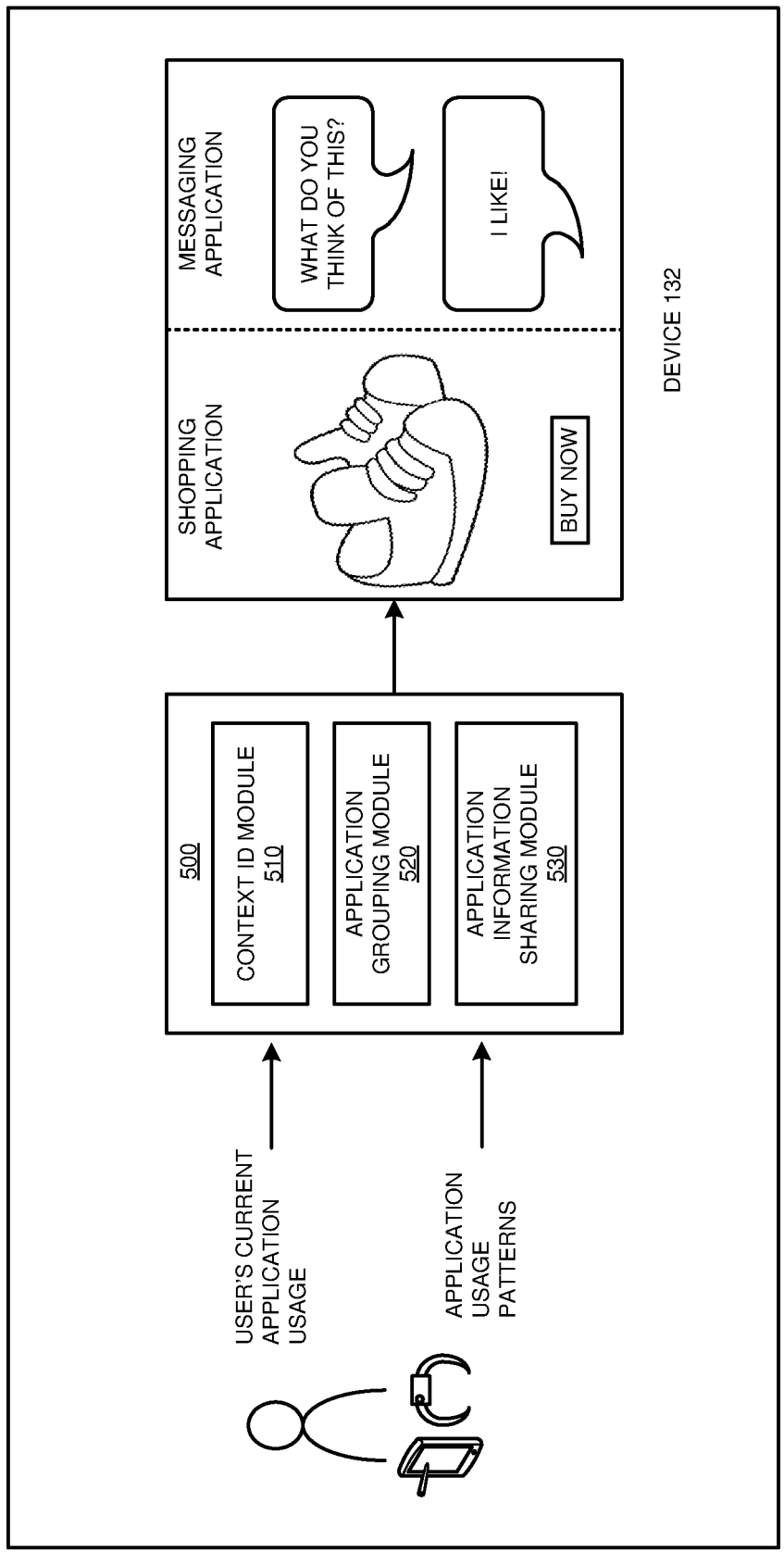
FIG. 5 depicts a block diagram of another portion of an example configuration for intelligent context-based application grouping in accordance with an illustrative embodiment.

With reference to FIG. 5, this figure depicts a block diagram of another portion of an example configuration for intelligent context-based application grouping in accordance with an illustrative embodiment. Application 500 is an example of application 105 in FIG. 1 and executes in device 132 or smart watch 134, or any of servers 104 and 106 and clients 110, 112, and 114 in FIG. 1.

Context identification module 510 monitors a user's behavior to identify similar user contexts. Application grouping module 520 forms applications into groups, to be activated concurrently. Application information sharing module 530 communicates information from one application to another, as appropriate to a particular usage pattern, to display contextually related information in an appropriate application. In FIG. 5, as an example, context identification module 510 has determined that it is Saturday at 10 pm, within a user's typical usage pattern of using a shopping application along with a messaging application, to communicate with friends while they shop for the same items. As a result, application grouping module 520 has activated the shopping application and the messaging application for concurrent user interaction. As well, application information sharing module 530 has taken information from the messaging application, such as a Uniform Resource Locator (URL) referencing a specific product, and sent this information to the shopping application. Thus, FIG. 5 shows both the shopping application and the messaging application on device 132, with the product referenced within the messaging application shown in the shopping application as well.

Figure 6:
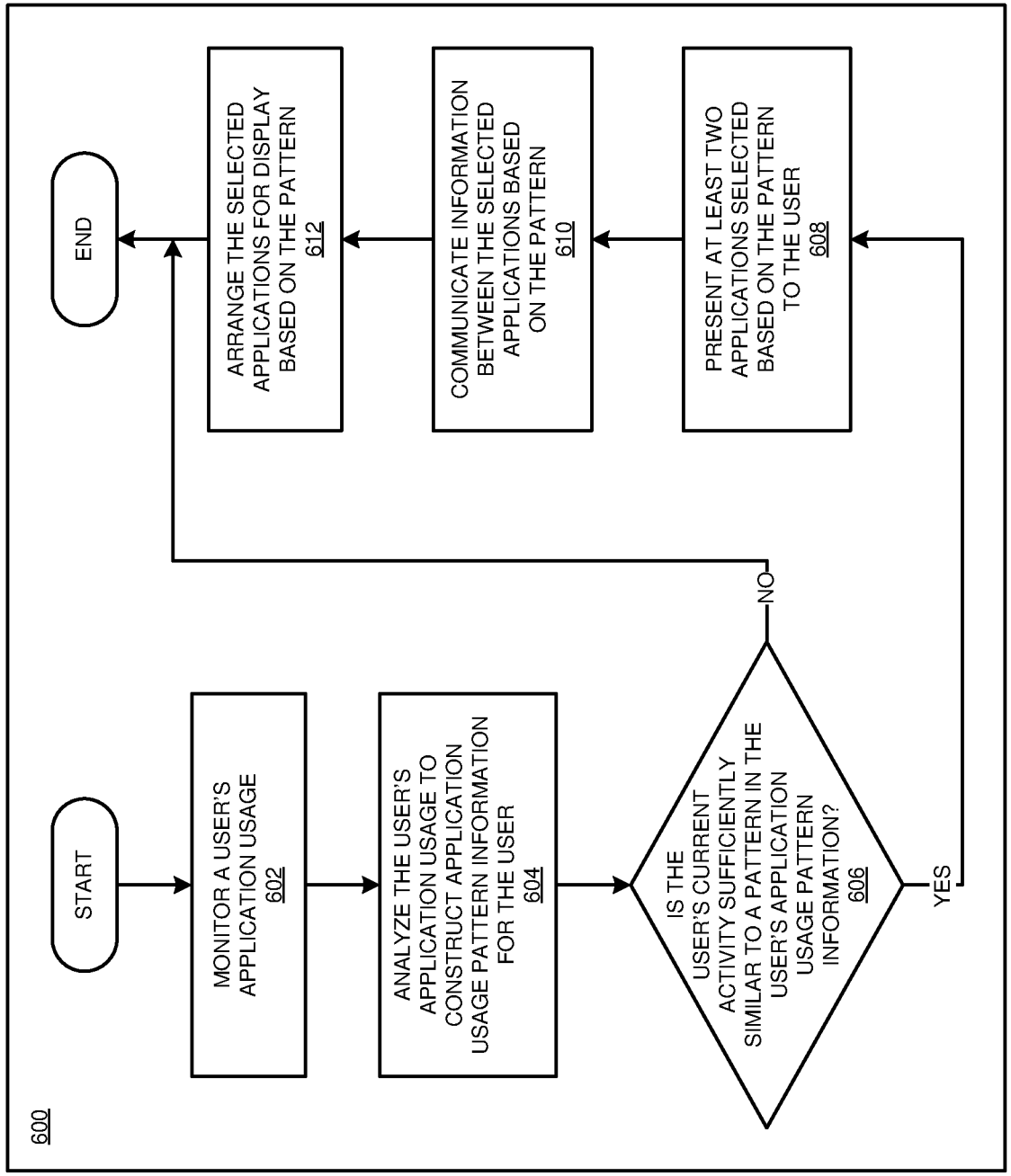
FIG. 6 depicts a flowchart of an example process for intelligent context-based application grouping in accordance with an illustrative embodiment.

With reference to FIG. 6, this figure depicts a flowchart of an example process for intelligent context-based application grouping in accordance with an illustrative embodiment. Process 600 can be implemented in application 300 in FIG. 3, application 400 in FIG. 4, or application 500 in FIG. 5.

In block 602, the application monitors a user's application usage. In block 604, the application analyzes the user's application usage to construct application usage pattern information for the user. In block 606, the application detects, from the user's current activity, whether the user's current activity is sufficiently similar to a pattern in the user's application usage pattern information. If so ("YES" path of block 606), in block 608, the application activates at least two applications, selected based on the pattern, for user interaction. In block 610, the application communicates information between the selected applications based on the pattern. In block 612, the application arranges the selected applications for display on one or more devices based on the pattern. Then the application ends.

Thus, a computer implemented method, system or apparatus, and computer program product are provided in the illustrative embodiments for intelligent context-based application grouping and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
monitoring, on a device, application usage information comprising, for each application in a set of applications on the device, a first time at which the application is activated and a second time at which the application is inactivated, a destination to which the application sends a first portion of data, a source from which the application receives a second portion of data, the first portion of data and the second portion of data, and contextual information;
constructing, from an analysis of the application usage information, an application usage pattern information, a pattern in the application usage pattern information identifying a second application in the set of applications, wherein the second application is concurrently active with a first application in the set of applications during a previous activity on the device, the pattern further identifying a sixth portion of data sent from the first application to the second application, the sixth portion of data sent from the first application to the second application while the first application and the second application are concurrently active on the device;
detecting, from a current activity on the device, that the current activity has a degree of similarity above a threshold degree of similarity to the previous activity of the pattern in the application usage pattern information;
activating, for user interaction responsive to the detecting, at least two applications selected based on the pattern thereby executing the at least two applications on the device, the at least two applications comprising at least a first activated application comprising a first user interface, and a second activated application comprising a second user interface; and
sending, based on the pattern as part of the activating, a fifth portion of data from the first activated application of the at least two applications to the second activated application of the at least two applications, the fifth portion of data determined according to the sixth portion of data identified in the pattern, prior to receiving the user interaction via the first user interface and the second user interface.

2. The method of claim 1, further comprising:
detecting a change in the current activity, the change causing the degree of similarity to reduce below the threshold degree of similarity;
determining that the change causes a new current activity to have a second degree of similarity to a second pattern in the application usage pattern information, the second degree of similarity exceeding the threshold degree of similarity; and
activating, responsive to the new current activity, and based on the second pattern, a third application from the set of applications and a fourth application from the set of applications.

3. The method of claim 1, wherein the contextual information comprises biometric information.

4. The method of claim 1, wherein the application usage pattern information further comprises a destination to which a sending application within the set of applications sends a third portion of data, a source from which a receiving application within the set of applications receives a fourth portion of data, applications within the set of applications, the third portion of data, and the fourth portion of data.

5. The method of claim 1, wherein the application usage pattern information further comprises an arrangement of applications on a display.

6. The method of claim 1, further comprising:
arranging, based on the pattern, a display of the activated applications.

7. The method of claim 1, wherein the pattern further identifies human heartbeat information associated with the activity.

8. A computer usable program product comprising one or more computer-readable storage media, and program instructions stored on at least one of the one or more storage media, the stored program instructions comprising:
program instructions to monitor, on a device, application usage information comprising, for each application in a set of applications on the device, a first time at which the application is activated and a second time at which the application is inactivated, a destination to which the application sends a first portion of data, a source from which the application receives a second portion of data, the first portion of data and the second portion of data, and contextual information;
program instructions to construct, from an analysis of the application usage information, an application usage pattern information, a pattern in the application usage pattern information identifying a second application in the set of applications, wherein the second application is concurrently active with a first application in the set of applications during a previous activity on the device, the pattern further identifying a sixth portion of data sent from the first application to the second application, the sixth portion of data sent from the first application to the second application while the first application and the second application are concurrently active on the device;
program instructions to detect, from a current activity on the device, that the current activity has a degree of similarity above a threshold degree of similarity to the previous activity of the pattern in the application usage pattern information;
program instructions to activate, for user interaction responsive to the detecting, at least two applications selected based on the pattern thereby executing the at least two applications on the device, the at least two applications comprising at least a first activated application comprising a first user interface, and a second activated application comprising a second user interface; and
program instructions to send, based on the pattern as part of the activating, a fifth portion of data from the first activated application of the at least two applications to the second activated application of the at least two applications, the fifth portion of data determined according to the sixth portion of data identified in the pattern prior to receiving the user interaction via the first user interface and the second user interface.

9. The computer usable program product of claim 8, further comprising:
    program instructions to detect a change in the current activity, the change causing the degree of similarity to reduce below the threshold degree of similarity;
    program instructions to determine that the change causes a new current activity to have a second degree of similarity to a second pattern in the application usage pattern information, the second degree of similarity exceeding the threshold degree of similarity; and
    program instructions to activate, responsive to the new current activity, and based on the second pattern, a third application from the set of applications and a fourth application from the set of applications.

10. The computer usable program product of claim 8, wherein the contextual information comprises biometric information.

11. The computer usable program product of claim 8, wherein the application usage pattern information further comprises a destination to which a sending application within the set of applications sends a third portion of data, a source from which a receiving application within the set of applications receives a fourth portion of data, applications within the set of applications, the third portion of data, and the fourth portion of data.

12. The computer usable program product of claim 8, wherein the computer usable code is stored in a computer readable storage device in a data processing system, and wherein the computer usable code is transferred over a network from a remote data processing system.

13. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

14. The computer usable program product of claim 8, wherein the pattern further identifies human heartbeat information associated with the activity.

15. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
    program instructions to monitor, on a device, application usage information comprising, for each application in a set of applications on the device, a first time at which the application is activated and a second time at which the application is inactivated, a destination to which the application sends a first portion of data, a source from which the application receives a second portion of data, the first portion of data and the second portion of data, and contextual information;
    program instructions to construct, from an analysis of the application usage information, an application usage pattern information, a pattern in the application usage pattern information identifying a second application in the set of applications, wherein the second application is concurrently active with a first application in the set of applications during a previous activity on the device, the pattern further identifying a sixth portion of data sent from the first application to the second application, the sixth portion of data sent from the first application to the second application while the first application and the second application are concurrently active on the device;
    program instructions to detect, from a current activity on the device, that the current activity has a degree of similarity above a threshold degree of similarity to the previous activity of the pattern in the application usage pattern information;
    program instructions to activate, for user interaction responsive to the detecting, at least two applications selected based on the pattern thereby executing the at least two applications on the device, the at least two applications comprising at least a first activated application comprising a first user interface, and a second activated application comprising a second user interface; and
    program instructions to send, based on the pattern as part of the activating, a fifth portion of data from the first activated application of the at least two applications to the second activated application of the at least two applications, the fifth portion of data determined according to the sixth portion of data identified in the pattern prior to receiving the user interaction via the first user interface and the second user interface.

16. The computer system of claim 15, wherein the pattern further identifies human heartbeat information associated with the activity.

* * * * *